US012131219B2

(12) United States Patent
Gao

(10) Patent No.: US 12,131,219 B2
(45) Date of Patent: Oct. 29, 2024

(54) CODE READER AND RELATED METHOD FOR REALTIME COLOR CALIBRATION OF IMAGING SYSTEMS FOR ITEM RECOGNITION WITHIN A CODE READER

(71) Applicant: Datalogic USA, Inc., Eugene, OR (US)

(72) Inventor: Wenliang Gao, Eugene, OR (US)

(73) Assignee: Datalogic IP Tech S.r.l., Lippo di Calderara di Reno (IT)

( * ) Notice: Subject to any disclaimer, the term of this patent is extended or adjusted under 35 U.S.C. 154(b) by 83 days.

(21) Appl. No.: 18/060,446

(22) Filed: Nov. 30, 2022

(65) Prior Publication Data

US 2023/0169287 A1 Jun. 1, 2023

Related U.S. Application Data

(60) Provisional application No. 63/264,697, filed on Nov. 30, 2021.

(51) Int. Cl.
G06K 7/14 (2006.01)
H04N 9/68 (2023.01)
H04N 9/73 (2023.01)
H04N 9/77 (2006.01)
H04N 17/00 (2006.01)

(52) U.S. Cl.
CPC ............ G06K 7/1413 (2013.01); H04N 9/68 (2013.01); H04N 9/73 (2013.01); H04N 9/77 (2013.01); H04N 17/002 (2013.01)

(58) Field of Classification Search
None
See application file for complete search history.

(56) References Cited

U.S. PATENT DOCUMENTS

| RE40,071 E | 2/2008 | Svetal et al. |
|---|---|---|
| 8,118,226 B2 | 2/2012 | Olmstead et al. |
| 8,752,768 B2 | 6/2014 | Gao |
| 8,800,874 B2 | 8/2014 | Gao |
| 8,998,092 B2 | 4/2015 | Gao |
| 9,004,359 B2 | 4/2015 | Shearin et al. |
| 9,519,810 B2 | 12/2016 | Gao et al. |
| 10,049,247 B2 | 8/2018 | Gao |
| 10,248,896 B2 | 4/2019 | Gao et al. |
| 10,805,587 B1 * | 10/2020 | Wilfred .................... G06T 7/70 |
| 10,970,501 B2 | 4/2021 | Gao |
| 11,176,342 B2 | 11/2021 | Gao |

(Continued)

*Primary Examiner* — Thien M Le
*Assistant Examiner* — April A Taylor
(74) *Attorney, Agent, or Firm* — Stoel Rives LLP

(57) ABSTRACT

A code reader includes a color imager and a processor operably coupled to the color imager. The processor is configured to: set an RGB imager pixel color gain; capture at least one image with active or ambient illumination using the color imager with a calibration target in view; calculate a mean value of R, G, B pixels for the at least one image; use a color plane as a reference, determining a color gain to set calibration parameters; capture at least one additional image using the calibration parameters; and save the calibration parameters if mean values of the R, G, B, pixels for the at least one additional image are within a predetermined range to be used by the camera for subsequent image capture, and apply to each pixel of the image a corresponding color correction matrix from among a plurality of stored color correction matrices.

20 Claims, 8 Drawing Sheets

(56) References Cited

U.S. PATENT DOCUMENTS

| | | | |
|---|---|---|---|
| 11,521,006 B2* | 12/2022 | Müller | G06K 7/1478 |
| 2010/0123009 A1 | 5/2010 | Cherry | |
| 2012/0118969 A1* | 5/2012 | Zolotov | G06K 7/1478 235/462.04 |

* cited by examiner

CODE READER AND RELATED METHOD FOR REALTIME COLOR CALIBRATION OF IMAGING SYSTEMS FOR ITEM RECOGNITION WITHIN A CODE READER

This application claims the benefit of U.S. Provisional Application No. 63/264,697, filed Nov. 30, 2021, and entitled "CODE READER AND RELATED METHOD FOR REALTIME COLOR CALIBRATION OF IMAGING SYSTEMS FOR ITEM RECOGNITION WITHIN A CODE READER, the disclosure of which is incorporated by reference herein in its entirety.

TECHNICAL FIELD

The present disclosure relates generally to scanners or code readers, and more particularly, to coder readers including image-based optical scanning system configured to perform color calibration of an imager or imaging chain.

BACKGROUND

Image-based optical scanning may employ auto white balance (AWB) for image capture. Illuminants estimation error from (AWB) may cause color shift, which for situations of item recognition (e.g., product recognition) in a retail environment may limit item recognition accuracy which can vary in different illumination conditions. The use of color patches, such as the ColorChecker Classic by X-Rite, is often used as a color calibration target for the color calibration of a color imager. For a barcode scanning system, it may be difficult to implement such a color patch target embedded in a scanner, due to size and clearness maintenance requirements.

BRIEF SUMMARY

A code reader comprises a color imager and a processor operably coupled to the color imager. The processor is configured to: set an RGB imager pixel color gain; capture at least one image with active or ambient illumination using the color imager with a calibration target in view; calculate a mean value of R, G, B pixels for the at least one image; use a color plane as a reference, determining a color gain to set calibration parameters; capture at least one additional image using the calibration parameters; save the calibration parameters if mean values of the R, G, B, pixels for the at least one additional image are within a predetermined range to be used by the camera for subsequent image capture; and apply to each pixel of the image a corresponding color correction matrix from among a plurality of stored color correction matrices.

A method for performing color calibration of a color imager in a code reader comprises setting an RGB imager pixel color gain, capturing at least one image with active or ambient illumination using a color camera with a calibration target in view, calculating a mean value of R, G, B pixels for the at least one image, using a color plane as a reference, determining a color gain to set calibration parameters, capturing at least one additional image using the calibration parameters, and saving the calibration parameters if mean values of the R, G, B, pixels for the at least one additional image are within a predetermined range to be used by the camera for subsequent image capture, and applying to each pixel of the image a corresponding color correction matrix from among a plurality of stored color correction matrices.

DETAILED DESCRIPTION

Figure 1:
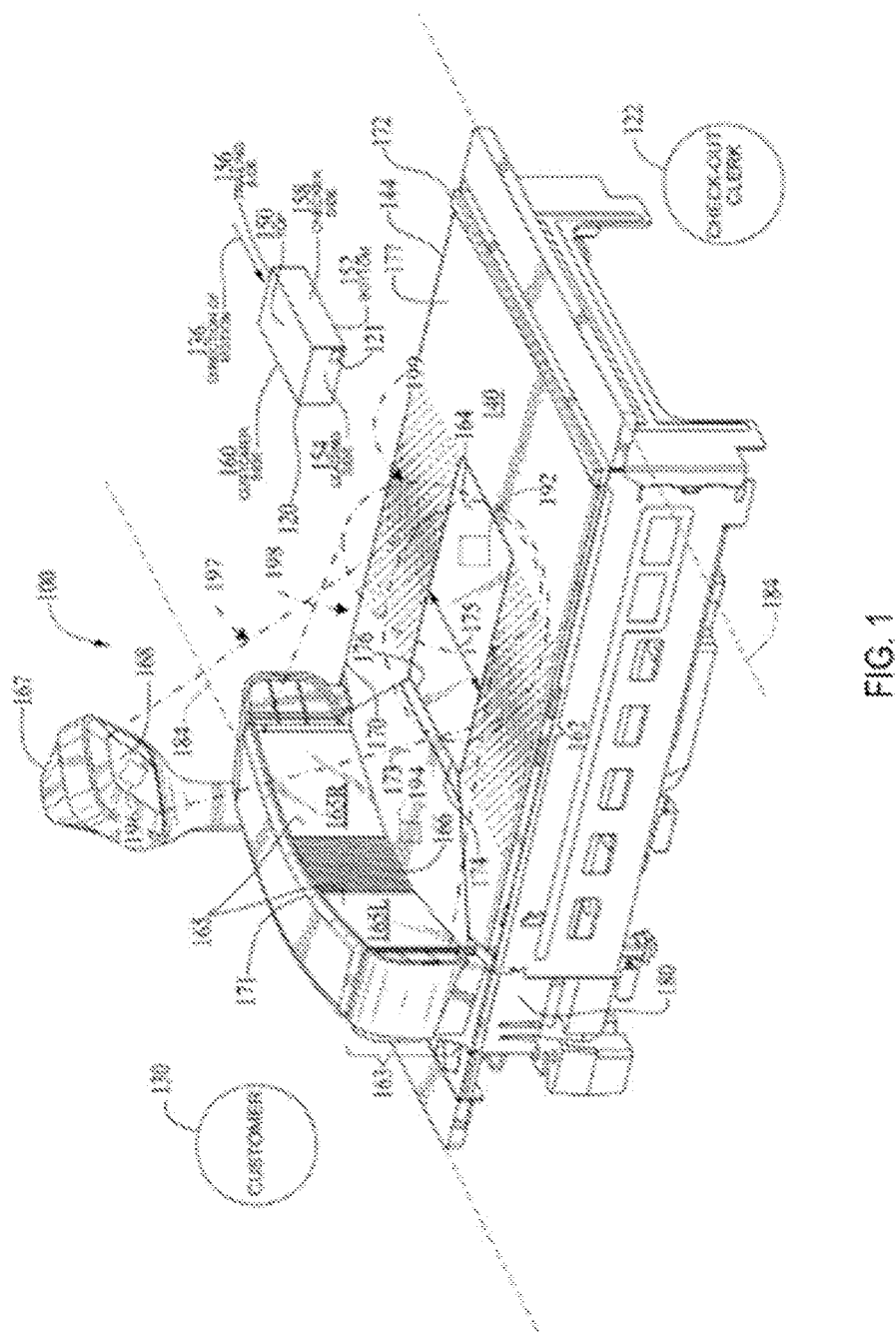
FIG. 1 illustrates a data reader and an object with an optical code that may be read by the data reader.

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

As used herein, "imager" and "camera" may be used interchangeably.

One or more implementations of the present disclosure are directed to optical code (e.g., barcode) readers (also referred to as "scanners"). Such scanners may include handheld scanners, fixed scanners (e.g., fixed retail scanners), presentation scanners, mobile computers, point of sale systems, vision systems (e.g., automated guided vehicles (AGVs), robotics, automated driving, and machine-vision (MV) systems) and/or other systems and devices in which the functionality of an optical code reader is desirable. The scanner may be configured as a stand-alone imager module (sometimes referred to as a "scan engine") that may be incorporated into a larger device or system. The scanner includes an optical sensor (e.g., imager) to capture an indicia that encodes data and a processor to interpret the indicia to decode the data. Illumination sources (e.g., red, white, etc.) may also be included to assist with image capture. The optical sensor may be a monochrome imager or a color imager depending on the particular application or desired capabilities of the scanner. The scanner may be configured to read and decode optical codes, such as 1D and 2D codes as well as high density codes, Dot codes, watermarking (e.g., Digimarc), optical character recognition (OCR), and other visual code and image recognition techniques for identifying an object. The embodiments described herein are often in the context of visual symbol-reading, but it is contemplated that principles of the present technologies relating to localization or ranging are likewise applicable in a multitude of other areas and within the scope of the disclosure. In some embodiments, the scanner may include communication modules configured for communication via communication technologies and protocols known by those skilled in the art.

Different configurations and details regarding the construction and components of a scanner are contemplated, as well as different environments for implementation according to embodiments of the disclosure. For example, additional features and configurations of devices are described in the following patents and patent applications: U.S. Pat. No. 9,004,359, issued Apr. 14, 2015, and entitled "OPTICAL SCANNER WITH TOP DOWN READER"; U.S. Pat. No. 10,049,247, issued Aug. 14, 1018 and entitled "OPTIMIZATION OF IMAGE FRAME MANAGEMENT IN A SWEEP-STYLE OPTICAL CODE DATA READER"; U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY"; U.S. Pat. No. 10,970,501, issued Apr. 6, 2021, entitled "BARCODE SCANNING SYSTEM WITH IMAGE OR VIDEO OUTPUT(S)"; and U.S. Provisional Application No. 63/293,563, filed Dec. 23, 2021, and entitled "FIXED RETAIL SCANNER WITH MULTI-PORT NETWORK SWITCH AND RELATED METHODS, the disclosure of each of which is incorporated by reference in their entirety. Some imagers employed within the housing of such bioptic scanners may be monochrome imagers, while some imagers may be color imagers such that one or more views of the scanner may provide monochrome images and/or one views (e.g., within the horizontal plane and/or vertical plane) of the scanner may provide color images to be analyzed (e.g., decoding, image recognition, etc.) by the system depending on the desired application. Similarly, the top-down reader (also referred to as "top-down imager") or other peripheral cameras coupled with the base scanner unit may include a monochrome imager and/or a color imager. Different form factors and imager views are contemplated, however, an example of such a bioptic scanner and an associated top-down reader is described below for discussion purposes.

FIG. 1 illustrates a data reader 100 and an object 120 with an optical code 121 that may be read by the data reader 100. For purposes of discussion, sides of the data reader 100 are referred to by corresponding locations of a checkout clerk 122, a customer 130, and a direction of motion 136 of the object 120. The object 120 is represented by a rectangular-shaped six-sided polyhedron, such as a cereal box (hereinafter referred to as a box-shaped object, package, or object). Furthermore, sides of the object 120 may be described with respect to direction of motion 136 over a surface 140 of a cover or platter 144 of the data reader 100. For example, the object 120 has a top side 150, a bottom side 152, and four lateral sides 154, 156, 158, and 160. The lateral sides include the leading side 154, i.e., the side leading the object 120 as it is passed through a read zone (described below), the trailing side 156 opposite the leading side 154, the checker side 158 (due to its proximity to the checkout clerk 122), and the customer side 160 (due to its proximity to the customer 130).

The locations of the checkout clerk 122 and the customer 130 are indicated to facilitate explanation and establish a relative frame of reference, but they are not intended as limiting the present disclosure. The data reader 100 is usable without the checkout clerk 122 or the customer 130, and either person can use the data reader 100 from any unobstructed location. It should also be noted that the data reader 100 may be implemented in a self-checkout (SCO) environment such that the customer performs the scanning activities typically from the checker side 158. Thus, customer side 160 and checker side 158 are merely labels used for purposes of discussion while recognizing that bioptic scanners 100 may be implemented in a variety of locations or orientation and/or for different use cases. In addition, the object 120 is described as a box-shaped package for ease of description, but the object 120 may have other shapes including cylindrical cans, fruit and other produce, or irregularly shaped packages, such as a bag of oranges, potato chips, or the like. Furthermore, the direction of motion 136 of the object 120 is illustrated as right-to-left (from the perspective of the checkout clerk 122), but other directions through a read zone (e.g., left-to-right, presenting from front-to-back, etc.) are equally applicable.

The data reader 100 includes a substantially horizontal section 162 and a substantially vertical section 163. The sections 162, 163 are disposed substantially orthogonal to each other, with the horizontal section 162 having a horizontal platter window 164 and the vertical section 163 having a split vertical window 165. From the perspective of the checkout clerk 122, the split vertical window 165 includes a left window 165L and a right window 165R. The left and right windows 165L, 165R are separated by a centrally located speaker grille 166.

The data reader 100 includes a top-down reader (TDR) 167 that houses a downward-facing window 168 and an artificial illumination source that directs illumination out through the window 168. Top-down readers may have different heights (e.g., 7 inch, 12 inch) for a particular application and desired field-of-view.

The platter 144 includes both a lower platter section 170 and an upper platter section 171. The lower platter section 170 encompasses the horizontal platter window 164, which is disposed in a recessed position and preferably mounted flush with the surface 140 of the lower platter section 170. The platter 144 may include an optional bump, rail, or raised section 172 at one end to inhibit objects 120 (e.g., spherical fruit) from rolling or sliding off the surface 140. At the other end of the platter 144, located between the speaker grille 166 and the horizontal platter window 164, the platter 144 has a wedge-shaped platter section 173 made of plastic or other suitable material. The section 173 extends horizontally away from the split vertical window 165, tapering until its narrowest side 174 is coextensive with a length 175 of the horizontal platter window 164. The narrowest side 174 of the section 173 abuts a customer side 176 of the horizontal platter window 164. The section 173 wedges into a U-shaped portion 177 of the platter 144 to form the generally horizontal surface 140 of the lower platter section 170. The U-shaped portion 177 is commonly constructed of smooth or brushed stainless steel, but may also be constructed from plastic; sheet metals such as aluminum; or other materials, including ceramics.

The upper platter section 171 is located atop the vertical section 163, vertically displaced at a location higher than the lower platter section 170. The vertical displacement forms a multi-plane platter embodiment as in the All-Weighs® platter available from Datalogic ADC, Inc. of Eugene, Oreg., or as described in U.S. Pat. No. RE 40,071. Accordingly, in some embodiments, the platter 144 provides a weigh-scale scale surface for the data reader 100 operating as a scale. Also, the aforementioned components of the data reader 100 are mounted (directly or indirectly) to a common base, housing, or chassis 180 in a checkstand lane or counter 184. In some embodiments, the platter 144 may comprise a structure that is readily removable from the chassis 180.

FIG. 1 also shows the data reader 100 with internal imagers 192, 194, and 196 for acquiring images via each of the respective windows 164, 165L, 165R, and 168. The three imagers 192, 194, and 196 may have associated optics (mirrors and lenses) to provide multiple perspectives for reading optical codes on the top side 150, the bottom side 152, the leading side 154, the trailing side 156, the customer side 160, and—depending on the view angle projected out via the horizontal platter window 164—the checker side 158. For example, the imager 196 of the top-down reader 167 produces a field-of-view 197 (or so-called read volume) outward and through the window 168. The read volume 197 is an undivided perspective encompassing a centrally located portion of the lower platter section 170, and spanning across the surface area of the horizontal platter window 164 to ensure that optical codes located on the top side 150 can be read by the imager 196 as the object 120 passes through a read volume 198. Imagers 192 and 194 also each simultaneously produce separate read volumes 198 to attempt to locate optical codes on various sides of the object 120 in order to minimize the possibility of a missed read. In other embodiments, a single imager and associated mirrors or optics may establish multiple read volumes for the imager.

A read zone may be formed from one or more partially overlapping read volumes, as is defined by one or more imaging devices, so as to read one or more sides of the object 120. For example, dual-plane or bi-optic style readers have horizontally and vertically oriented imaging devices producing overlapping read volumes. Dual-plane or bi-optic style readers are popular for high-volume applications because they provide multiple overlapping perspectives (or fields-of-view) that establish a larger read zone, and they provide simultaneous views of several sides of an object. In FIG. 1, a read zone 199 encompasses the read volumes 197 and 198 and is generally indicated by a surface texture design on the platter 144. Of course, other arrangements and placement of imagers are contemplated for establishing a read volume from multiple angles and fields-of-view. As discussed above, some imagers within such a data reader may include monochrome imagers while other imagers may include color imagers. In some embodiments, all imagers may be color imagers. Color imagers may be used in barcode readers for barcode reading as well as produce and item recognition/verification. Color accuracy is important in both cases. Embodiments of the disclosure related to calibration including white balance and color correction for improving color accuracy as will be described further below. Embodiments of the disclosure may include employing a predefined sets of color gain values and corresponding color correction matrices stored into the scanner (also referred to as a "data reader" or "code reader"). The predefined sets of calibration parameters may be pre-loaded (e.g., at the manufacturing site during camera assembly and test), but may be updated later. During operation, the scanner At a first time (e.g., power up), the scanner collects images including the calibration target (e.g., the platter, an embedded target, etc.) to determine initial gain values and a color correction matrix (CCM) to apply for white balance and color correction. During real-time operation, the scanner may update the calibration using a calibration target. In some embodiments, the scanner may use the same calibration target for updating its calibration or may use a different calibration target. In some embodiments, items being read (e.g., via the label quiet zone or other known features) may be used for calibration The data reader 100 may comprise an in-counter sweep data reader, such as a Magellan® 9300i, 9400i, or 9800i, all of which are available from Datalogic USA, Inc. of Eugene, Oreg. According to another embodiment, the data reader 100 may comprise a presentation data reader, such as a Magellan® 1500i, which is also available from Datalogic USA, Inc. A presentation data reader, however, is typically used in an on-counter configuration, in which case a user ordinarily would not rapidly sweep an object through the read zone of the presentation data reader.

Embodiments of the disclosure may be configured to produce color (i.e., illuminants) ground truth through color calibration target(s) inside an optical view of an optical reader, such as bioptic scanner, single plane scanner (e.g., presentation scanner), and/or top-down reader to an optical reader. Embodiments of the disclosure include performing color calibration for one or more color cameras of a scanner system. In some embodiments, color calibration for the camera may be performed at system power up. In some embodiments, color calibration may be performed at a predefined interval (e.g., every 30 minutes) or another predefined event (e.g., when no item is on platter when the calibration target is not blocked). In some embodiments, color calibration may be performed when the system is in use (e.g., for item recognition) and the calibration target (e.g., embedded calibration target and/or other calibration target used) is not blocked. Other embodiments may include initiating color calibration responsive to an external trigger, such as a host command, manual user input, etc. Thus, color calibration process may be performed at power up and/or during operation of the scanner, such as in response to manual activation, an automatic triggering event, periodic timed updates, and/or based on other criteria. As a result, more accurate produce/item recognition may be achieved for different ambient conditions.

As described more fully below, embodiments of the disclosure may include one or more color correction matrices (CCM) that may be selected by the scanning system from among a plurality of stored CCMs to apply to subsequent image capture after calibration has occurred. Embodiments of the disclosure may include determining white balance adjustments (e.g., Color_Gain_Red, Color_Gain_Blue) and CCM (e.g., $M_{3\times 4}$ matrix) values under different ambient conditions at factory that can later be applied as determined for a given lighting condition during operation of the scanner in the field.

Figure 2:
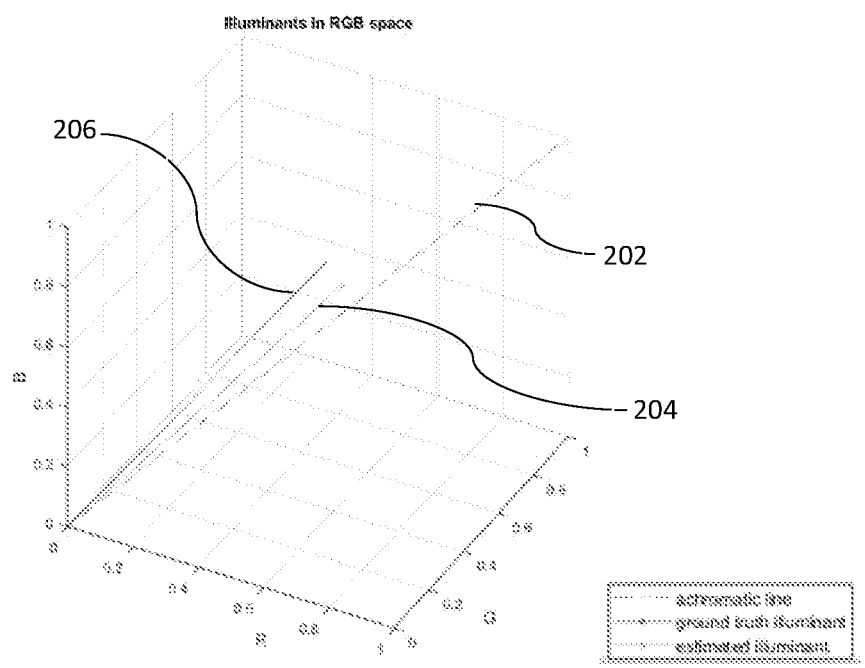
FIG. 2 is a plot showing a white balance estimation error in RGB space.

FIG. 2 is a plot showing a white balance estimation error in RGB space. Line 202 shows the achromatic line, line 204 shows an estimated illuminant, and line 206 shows a determined ground truth illuminant. In barcode scanning systems, the items in view are not necessary statistically "grey," which may cause illuminant estimation error (i.e., the angular difference between the ground truth illuminant 206 and the estimated illuminant 204 as shown in FIG. 2) by an AWB algorithm.

Figure 3:
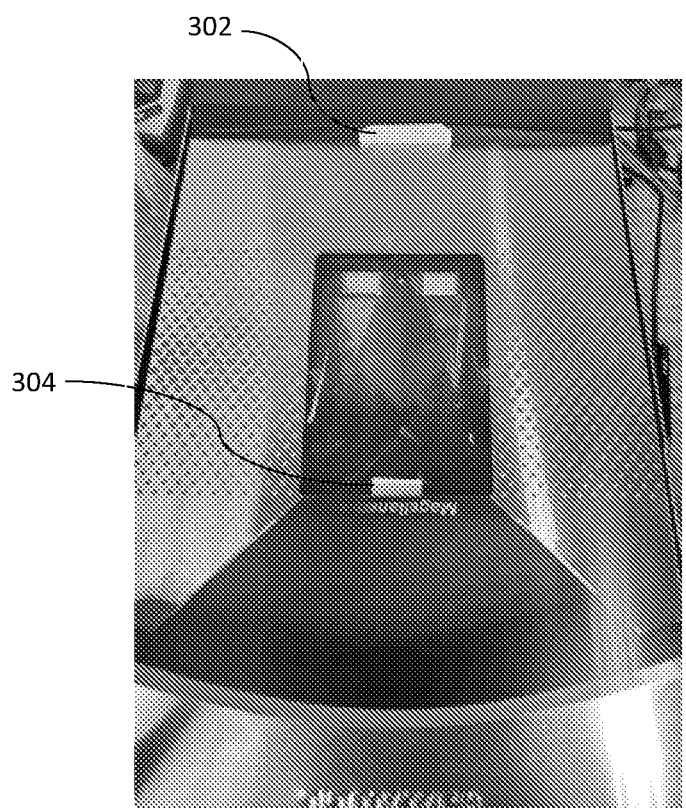
FIG. 3 is an illustrated image showing a base scanner portion of a scanner system according to an embodiment of the disclosure.

FIG. 3 is an illustrated image showing a base scanner portion (e.g., horizontal base unit for a bioptic scanner) of a scanner system according to an embodiment of the disclosure. In particular, the view of FIG. 3 is similar to an image captured by a color camera located within a top-down reader or other camera having an overhead field-of-view of the base scanner portion.

In some embodiments, one or more calibration target(s) 302, 304 may be disposed within the base scanner portion to assist the scanner system in determining the ground truth illuminant used for white balance estimation and/or color calibration. FIG. 3 shows a base scanner portion (e.g., horizontal base unit) of a bioptic scanner having calibration targets 302, 304 disposed (e.g., embedded) in the housing at a location within the field-of-view of the corresponding camera. For example, a first calibration target 302 may be disposed on or in an outer surface (e.g., fruit rail) of the platter region of the base scanner portion. A second calibration target 304 may be disposed below a window of the base scanner portion. Of course, one or more calibration targets may be disposed at different locations (or additional locations) that may be within the field-of-view of the color camera being calibrated. Locations for such embedded calibration targets may be selected for minimizing wear and damage to the calibration target during normal use of the bioptic scanner.

As the view shown in FIG. 3 may be associated with the field-of-view of a color camera located within a top-down reader or other camera having an overhead view of the base scanner portion, one or more calibration target 302, 304 may be viewable from such an overhead view. In some embodiments, one or more calibration targets within the base scanner area may also be viewable from one or more color cameras positioned within the housing of the base scanner, such as those having a field-of-view exiting the vertical window of a bioptic scanner. Similar calibration targets may be disposed at other locations for calibrating color cameras having field-of-views exiting the horizontal window of the bioptic scanner. For example, calibration targets may be disposed at locations on or within the vertical housing portion for the base unit of the bioptic scanner. The calibration target used may be a white target, a grey target, a color patch, etc. that may be used by the color correction process. In some embodiments, the surface 140 (FIG. 1) of the cover or platter 144 may itself be used as a calibration target. Such a surface 140 may be stainless steel. The goal of the color correction process may be to match reduce the color distance between measured color of an image pixel value and actual known color target value.

In general, Total Illuminants=Ambient Illuminants+Active Illuminants

Real-time color calibration may not be required (with pre-calibration at factory) in the field if the active illuminants are much higher than ambient illuminants (such as 20× for a typical barcode scanner with pulsed illumination and very short exposure time in the range of 100 μsec). However, this is not always the case and embodiments of the disclosure provide methods for performing real-time color calibration.

The color fidelity of a color imaging calibration system may include two main parameter sets. The first parameter set is white balance, and the second parameter set is color correction. With respect to white balance, the calibration target may be grey with a flat reflective response over the full visible spectrum. A goal of the white balance correction method may be to adjust color gain so that the median pixel values of R, G, B are equal as described above. The result may be to adjust the Color_Gain_Red, Color_Gain_Blue, and use Color_Gain_Green as reference as described above.

As an example operation, an image may be captured from the color camera (e.g., within a TDR, within a horizontal housing of a scanner, within a vertical housing of a scanner, within a peripheral device, etc.) with a color calibration target within its field-of-view. First, the color camera may set the RGB imager pixel color gain the same as each other within their respective image register settings for the gain. In other words, the red color gain (R_Gain), the blue color gain (B_Gain), and the green color gain (G_Gain) may be set to be equal to each other. Second, an image may be captured by the color camera, which may be captured with a combination of active and ambient illumination. Third, the mean values for each of the R, G, B pixels may be calculated from the captured image. Fourth, using one of the color planes as a reference, color gain adjustments may be calculated, and then the color gain adjustments as calculated may be set as the updated calibration parameters within the register settings for the camera. The calculation may be performed by a system processor for the scanner and/or via a dedicated processor for the color camera, such as an on-board processor for a smart camera system.

As an example, the green color plane may be used as a reference to determine color gain adjustments for the red color gain and blue color gain parameters. In some embodiments, the blue color plane may be used as a reference to determine color gain adjustments for the green color gain and red color gain parameters. In some embodiments, the red color plane may be used as a reference to determine color gain adjustments for the green color gain and blue color gain parameters.

As a more specific illustrated example, each color gain may be initially set to a default value (e.g., 100). In other words, the image register settings may be set to R_Gain=100, G_Gain=100, B_Gain=100. After capturing an image, the color gains may be measured at different levels, such as R_Gain=100, G_Gain=90, and B_Gain=60. In this example, the green color plane may be used as a reference (e.g., G_Gain=90) to determine color gain adjustments for the other color gain values. In this case:

Red_Adjustment=G_Gain/R_Gain (e.g., expressed as a percentage); and

Blue_Adjustment=G_Gain/B_Gain (e.g., expressed as a percentage).

As a result, in this example the color gain adjustments for the R_Gain may be 90% and the color gain adjustment for B_Gain=150% when using green as the reference color plane.

In some embodiments, as described above, the reference may be a green color plane and the red and blue color gains may be calculated as the updated calibration parameters. In other embodiments, the reference may be a blue color plane and the red and green color gains may be calculated as the updated calibration parameters. In other embodiments, the reference may be a red color plane and the blue and green color gains may be calculated as the updated calibration parameters.

In order to verify the calibration, another image may be captured with the calibrated color gains applied. The mean value of R, G, B pixels may be calibrated. If these values are equal or otherwise within a predetermined tolerance range, the calibration may be deemed proper, otherwise, the process may be repeated. Finally, the calibrated color gains may be saved in register settings that are then used by the color camera for color image capture until the next calibration event occurs.

With respect to color correction, the color response may not be linear, just as human color perception is not linear. Thus, in order to improve the color fidelity, a color correction matrix (CCM) (e.g., 4×3 elements) may be applied to each pixel of a captured image. The color correction may be adaptive and may be performed after white balance adjustments.

As an example, typical retail stores could have a variety of different indoor ambient lighting conditions. Examples of such ambient lighting conditions may include LED, Cool white, 6500K; LED, Neutral white, 4000K; LED, Warm white, 2700K; Fluorescent (CFL tube etc); Incandescent Blub (tungsten filament); and Halogen. The measurements for each condition may be recorded for different illumination conditions (e.g., active illumination on/off) as shown in the following table. Measured values may be pre-stored in the scanner for use as an initial factory calibration.

| Ambient Light condition | Active Ilium | Color_Gain Red | Color_Gain Blue | CCM (3 × 4) |
|---|---|---|---|---|
| LED, Cool, 6500K | On | GR11 | GB11 | CCM11 |
| LED, Neutral, 4000K | On | GR12 | GB12 | CCM12 |
| LED, Warm, 2700K | On | GR13 | GB13 | CCM13 |
| Fluorescent (CFL tube) | On | GR14 | GB14 | CCM14 |
| Incandescent Blub | On | GR15 | GB15 | CCM15 |
| Halogen | On | GR16 | GB16 | CCM16 |
| LED, Cool, 6500K | Off | GR21 | GB21 | CCM21 |
| LED, Neutral, 4000K | Off | GR22 | GB22 | CCM22 |
| LED, Warm, 2700K | Off | GR23 | GB23 | CCM23 |
| Fluorescent (CFL tube) | Off | GR24 | GB24 | CCM24 |
| Incandescent Blub | Off | GR25 | GB25 | CCM25 |
| Halogen | Off | GR26 | GB26 | CCM26 |
| Sunlight | Off | GR31 | GB31 | CCM31 |

A plurality of different color calibration matrices (e.g., CCM11-CCM31 as shown above) may be stored for the imaging system such that during the adaptive color adjustment phase, measured color gains may be determined which then may be used to select the appropriate corresponding CCM. Thus, each known ambient light condition that is pre-stored may include both stored color gain values and a corresponding color correction matrix during a period of active illumination being enabled and also during a period when active illumination is not enabled.

In some embodiments, some color cameras of a code reader system may be used for object recognition (e.g., produce recognition, item recognition, item validation, etc.) only. In some embodiments, some color cameras of a code reader system may be used for barcode reading only. In such embodiments, a single set of pre-stored color gain values and corresponding color correction matrices may be for different known (e.g., tested) lighting conditions may be used for a particular camera used for a single purpose. In some embodiments, some color cameras of a code reader system may be used for multiple purposes, such as both barcode reading and object recognition. Thus, such color cameras may be configured to operate in multiple modes (e.g., barcode reading mode, object recognition mode, item validation mode, produce recognition mode, etc.). A multi-mode color camera may switch modes automatically (e.g., in a sequence, such as alternating between modes) and/or triggered based on an event (e.g., user input, a detected weight on the scale, image analysis, etc.) In some embodiments, a multi-mode camera may have multiple sets of pre-stored color gain values and corresponding color correction matrices. For example, a multi-mode camera may have a first set of pre-stored calibration parameters (e.g., color gain values and corresponding color correction matrices) for the different known (e.g., tested) lighting conditions when operating in a first mode (e.g., object recognition mode), and a second set of pre-stored calibration parameters (e.g., color gain values and corresponding color correction matrices) for the different known (e.g., tested) lighting conditions when operating in a second mode (e.g., object recognition mode), and so on. Thus, depending on which mode the camera is presently operating in, the color calibration process will use the particular set of calibration parameters for that mode when determining the gain values and color correction matrices to be applied for that mode.

Figure 4:
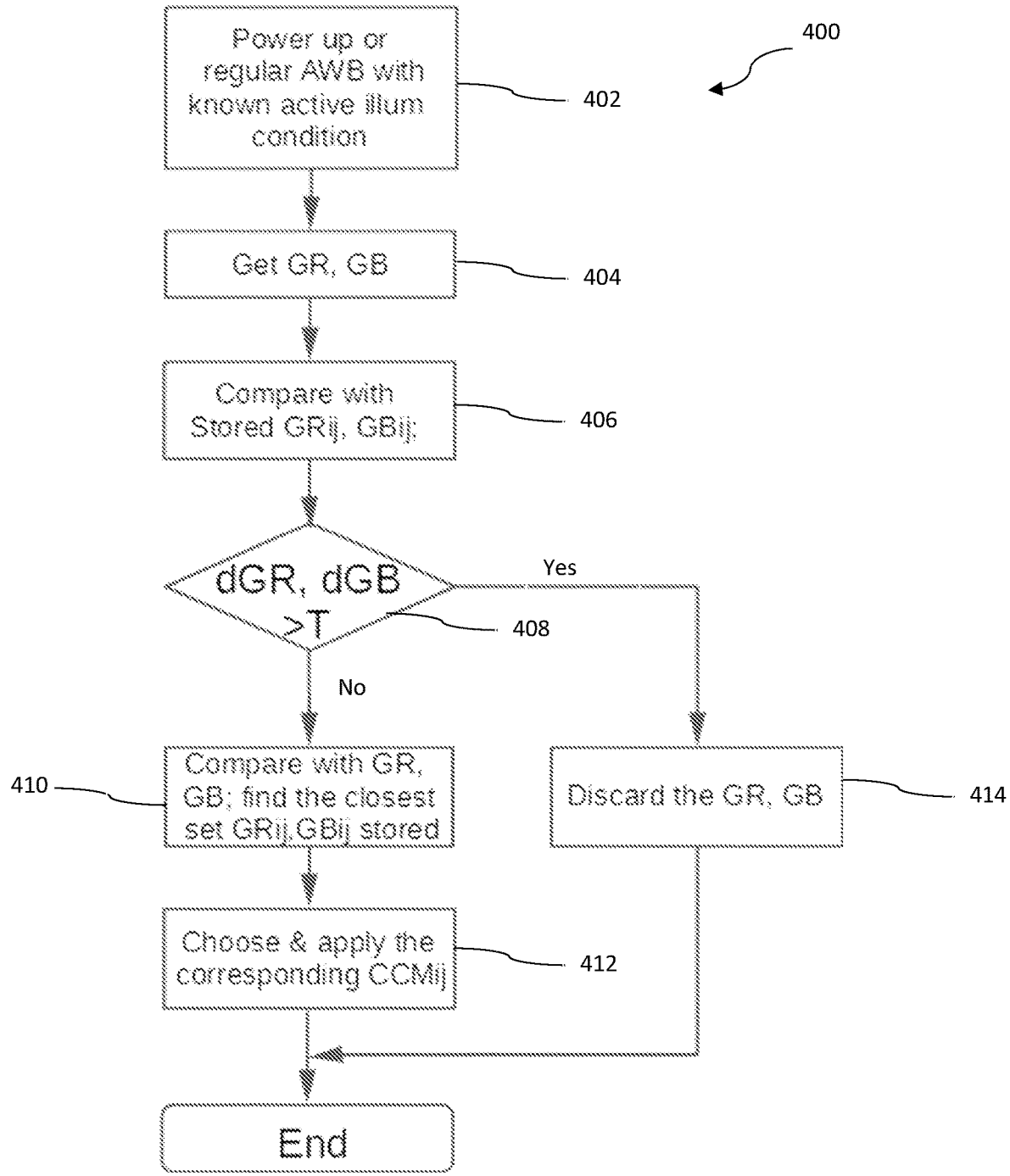
FIG. 4 is a flow chart illustrating a method for color calibration of a color camera according to an embodiment of the disclosure.

FIG. 4 is a flow chart 400 illustrating a method for color calibration of a color camera according to an embodiment of the disclosure. The color calibration process may be implemented in inside the camera module (e.g., TDR, color camera modules within the base scanner, etc.) and/or on the host side (e.g., parameters and/or images may be loaded to the host from the camera module at power up or other time during use). The host performing such color calibration may include processing modules within the base scanner and/or a remote device. The color calibration process may include white balance correction as well as color correction.

At operation 402, the color camera may perform automatic white balance (AWB) to obtain color gain values for the captured image. This AWB may be performed at power up and/or other color calibration event as described above. In this case, the active illumination state is known based on the scanner operation while the particular ambient lighting conditions may be unknown. The result from AWB is red color gain (GR) and blue color gain (GB), which are provided at operation 404. These color gain values are the color gains as previously described.

At operation 406, the calculated color gain values GR and GB may be compared with the stored values $GR_{ij}$, $GB_{ij}$ to find the closest ambient lighting condition which may be used to determine whether to apply the calculated gain values and which corresponding color correction matrix to be applied to the image.

At operation 408, minimum color gain difference values may be determined that may then be compared to predetermined thresholds for determining whether or not to use the calculated gain values for white balance correction and which color correction matrix to use for color correction. The color gain difference values may include a Combined Difference Value ($dC_{ij}$) that considers both color gains. Color gain difference values may also include determining individual difference values against predetermined thresholds including Red Difference Value (dGR) and Blue Difference Value (dGR). The difference values in this example are based on the use of green plane as the reference plane, but other reference planes are contemplated as described above.

Continuing with this example, Combined Difference Value ($dC_{ij}$) may be defined as:

$dC_{ij}$=min [$(GR-GR_{ij})^2+(GB-GB_{ij})^2$]; for i=1:3, j=1:6 as in the above table.

Red Difference Value (dGR) may be defined as:

$$dGR=|GR-GR_{ij}|$$

Blue Difference Value (dGR) may be defined as:

$$dGB=|GB-GB_{ij}|$$

These difference values ($dC_{ij}$, dGR, dGB) may be compared to corresponding predetermined thresholds (THD_C, THD_R, THD_B).

If each difference value is less than its corresponding predetermined threshold $$|GR-GR_{ij}|<THD\_R,\&\&|GB-GB_{ij}|<THD\_B,\&\&$$
$$dCij<THD\_C;$$

then the color gains GR, GB may be used to find the closest set of stored color gains (e.g., GRij, GBij) at operation 410, which selected set is then used to determine which corresponding color correction matrix CCMij should be applied for the color correction of the image at operation 412.

If the minimum color gain differences are greater than their threshold values, the current values for the color correction will remain at operation 414 (i.e., the new color gain settings GR, GB are discarded) and no color correction matrix is selected since it may be caused by a wrong calibration target.

As described above, real-time calibration (e.g., white balance and color correction) may be performed based on a calibration target, such as the scanner platter itself or an embedded feature within the field-of-view (e.g., inside the scanner window and/or on or near the housing of the scanner, etc.). In this case, the calibration target must not be blocked when the calibration (e.g., white balance and color correction) is performed. In some embodiments, a portion of the item being scanned may be used as the calibration target. For example, the barcode quiet zone may be a convenient and reliable calibration target, but the quiet zone is not always white or grey. To simplify the calibration process, the label and barcode quiet zone for calibration may be from the same original raw image captured by the scanner (as opposed to being from images captured by different color cameras in the system). As a result, a complicated correlation between different images can be avoided.

In order to ensure the quiet zone are acceptable for color calibration (e.g., white or grey), in some embodiments of the disclosure, the color calibration may be based on a database of known quiet zone samples that are acceptable for calibration. Samples of various quiet zones may be obtained to generate a database of the common color gains from the label quiet zone samples. In this case, the assumption is that most common color label quiet zones are white/grey. The database may have any number of desired entries (e.g., 500) sufficient to enable the system to perform the calibration in an acceptable manner. During operation, if the label read matches one of the labels in the known sample database, the quiet zone of this label can be used for white balance.

The sample database may be stored within memory of the scanner, and may include labels from common items purchased for a particular region or location. For example, a particular store may manage its own common items as part of the database. In some embodiments, a group of stores may manage a shared database used for each scanner of the group of stores. In some embodiments, the shared database may be centrally managed, but stored locally on an individual scanner with periodic updates whenever changes to the database occurs. Thus, embodiments of the disclosure may include using known statistics of the quiet zones for a predefined set of items of a store (e.g., 500 common items purchased) used by a scanner to modify white balance and color correction values during real-time operation. In this case, when the scanned item is included in the reference dataset, the color of the quiet zone is known. As a result, the scanner may perform the color calibration (e.g., white balance and color correction) in a precise manner by setting the new gain values for the color channels. If the scanned item is not in the reference dataset no changes are made.

Figure 5:
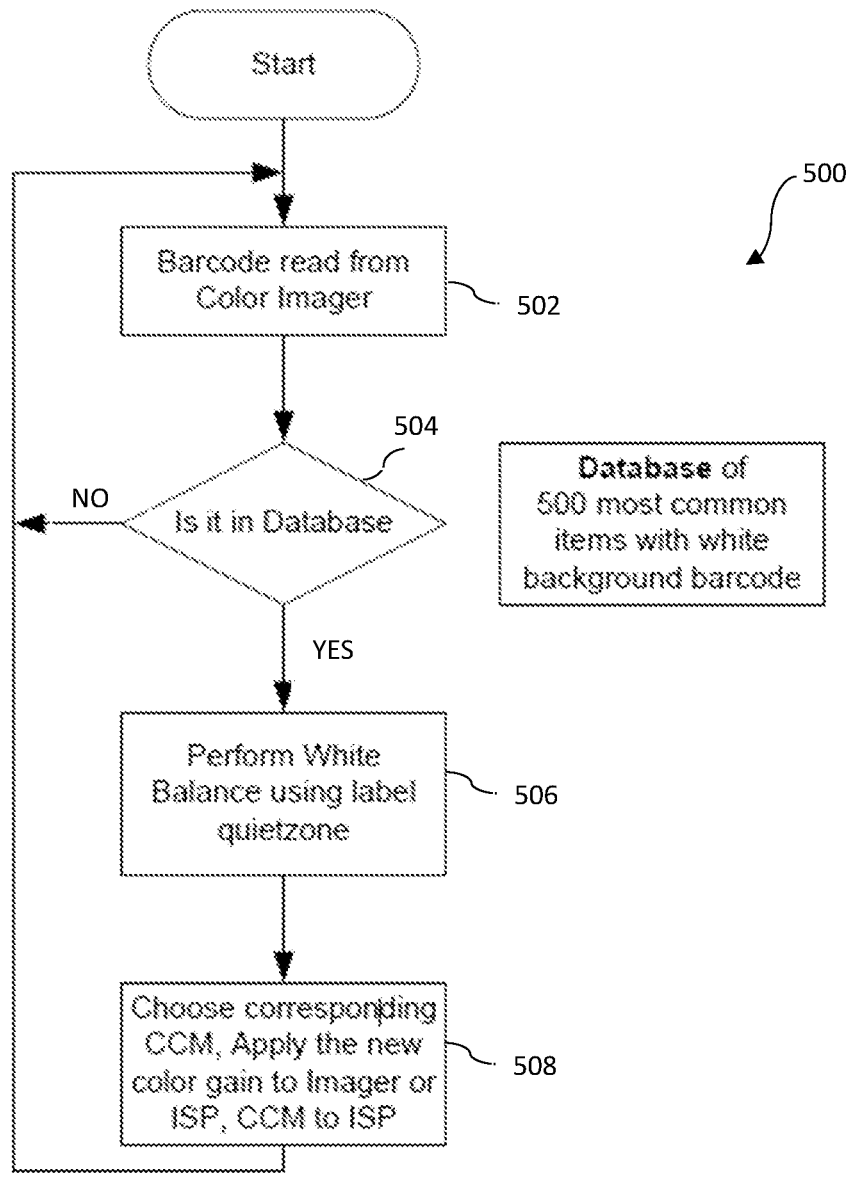
FIG. 5 is a flowchart illustrating a method of performing color calibration using an item database according to an embodiment of the disclosure.

FIG. 5 is a flowchart illustrating a method of performing color calibration using an item database according to an embodiment of the disclosure. In this example, the scanner may have a database of known labels with acceptable quiet zones or other identifiable features that can be used as a calibration target. Such a database may be based on common items purchased to increase the likelihood of being scanned by a customer. In this example, the database includes 500 such items but any number of items may be used as desired.

At operation 502, an item may be scanned and a barcode may be read (and/or the item may be identified by other known methods). At operation 504, the scanner may determine if the scanned item is one of the items in the known database for having a label with an acceptable quiet zone and/or other identifiable features that can be used as a calibration target. If the item is not in the known database, the scanner may not use the item for purposes of color calibration. If the item is in the known database, the scanner may use the label quiet zone (and/or other identifiable features previously deemed acceptable) for color calibration. In particular, the white balance values and color correction matrix may be determined and applied to the imager and/or image processor (operations 506, 508) as described above.

In some embodiments, the scanner may be configured to perform color calibration even if the labels being read during real-time operation are not included in a known sample database. As an example, embodiments of the disclosure may include a method for producing real-time color calibration from a single color imager of the scanner using a statistical distribution of the color gain from multiple images (e.g., 50 images) from the same imager during its current operational usage. The color imager may be used to identify the calibration quiet area and accumulate statistics over time to modify white balance and color correction values.

During this real-time operation, the scanner may start detecting labels and calculating the WB gain levels from the label quiet zones, with the statistics being accumulated in a buffer. Based on the fact that the most part of quiet zones are white or gray, after a predefined number of decodes (e.g., 20 labels, 50 labels, 100 labels, etc.) the most frequent (e.g., mode) gain values (e.g., for red channel and blue channel) may be determined to be associated to white/gray quite zone and will be set to improve accuracy on color fidelity.

Figure 6:
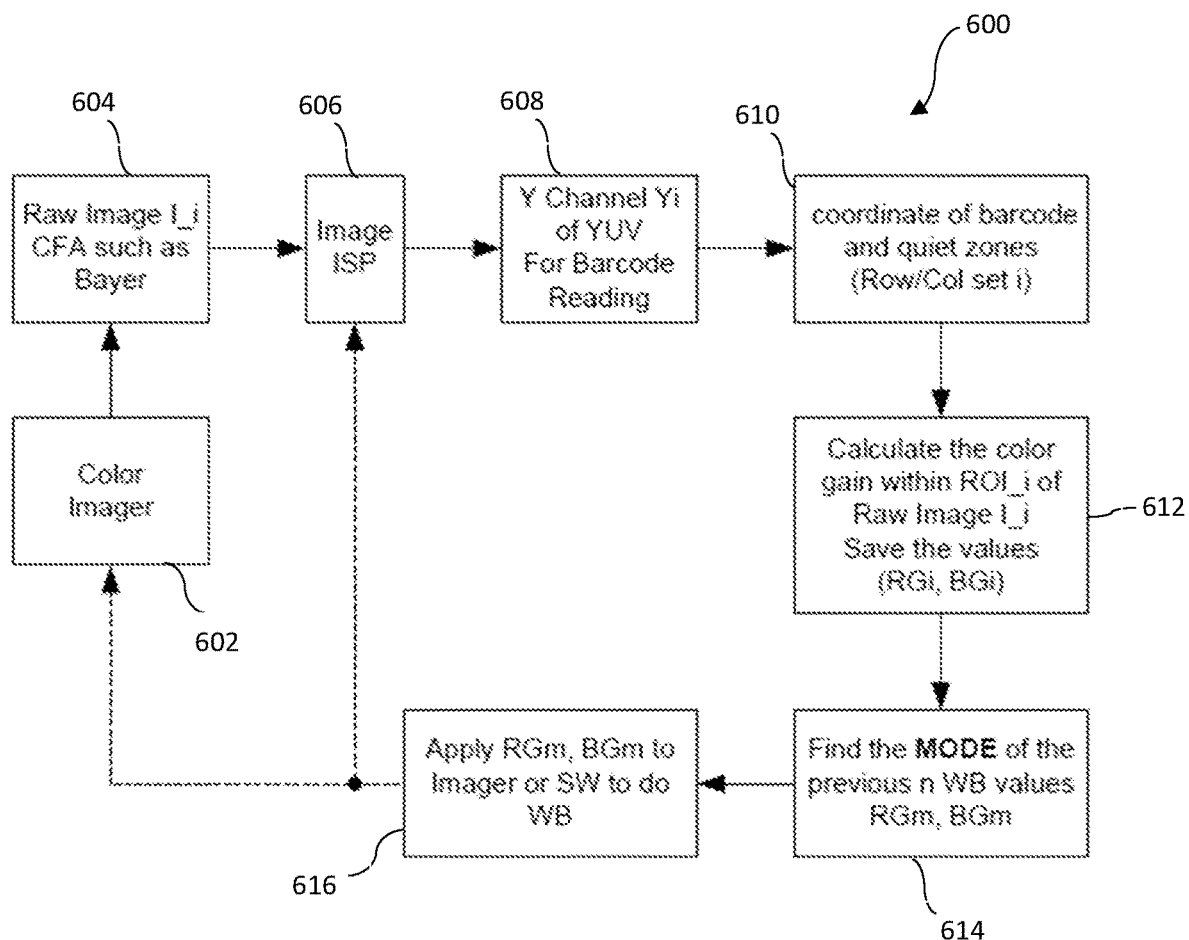
FIG. 6 is a simplified block diagram showing certain elements and related process flow for illustrating a method of performing color calibration using accumulated statistics according to an embodiment of the disclosure.

FIG. 6 is a simplified block diagram showing certain elements and related process flow for illustrating a method of performing color calibration using accumulated statistics according to an embodiment of the disclosure. A color imager 602 may capture a color image which may include a color filter array 604 (e.g., Bayer filter). The raw image may be provided to the image processor (ISP) 606 which may then be processed (operation 608) for barcode reading. At operation 610, the processor may identify the coordinates (e.g., row/col set) of the barcode and a region of interest (ROI) used as the calibration target. In this example, the ROI is the related quiet zone for a barcode. At operation 612, the processor may determine the color gain values within the region of interest (ROI) of the raw image, which color gain values may be saved for being accumulated over a predetermined number (n) of barcode reads. After a predetermined number of barcode reads have been performed with the color gain value results accumulated and saved, these results may be analyzed in operation 614 to determine which gain values (e.g., WB values) and corresponding color correction (CCM) to apply. In some embodiments, the determination may be based on finding the mode of the accumulated color gain values over the predetermined number (n) results. At operation 616, the color calibration parameters (e.g., color gain values and/or color correction matrix) may be applied to calibrate the color imager 602. These parameters may be applied to the color imager 602 and/or to the image ISP 606 to be applied in software for capture and analysis of subsequent images.

Figure 7A:
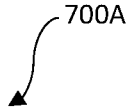
FIGS. 7A, 7B, 7C, and 7D show an example of such accumulation of label reads that may be used for determining color calibration parameters for calibration during realtime use.
Figure 7B:
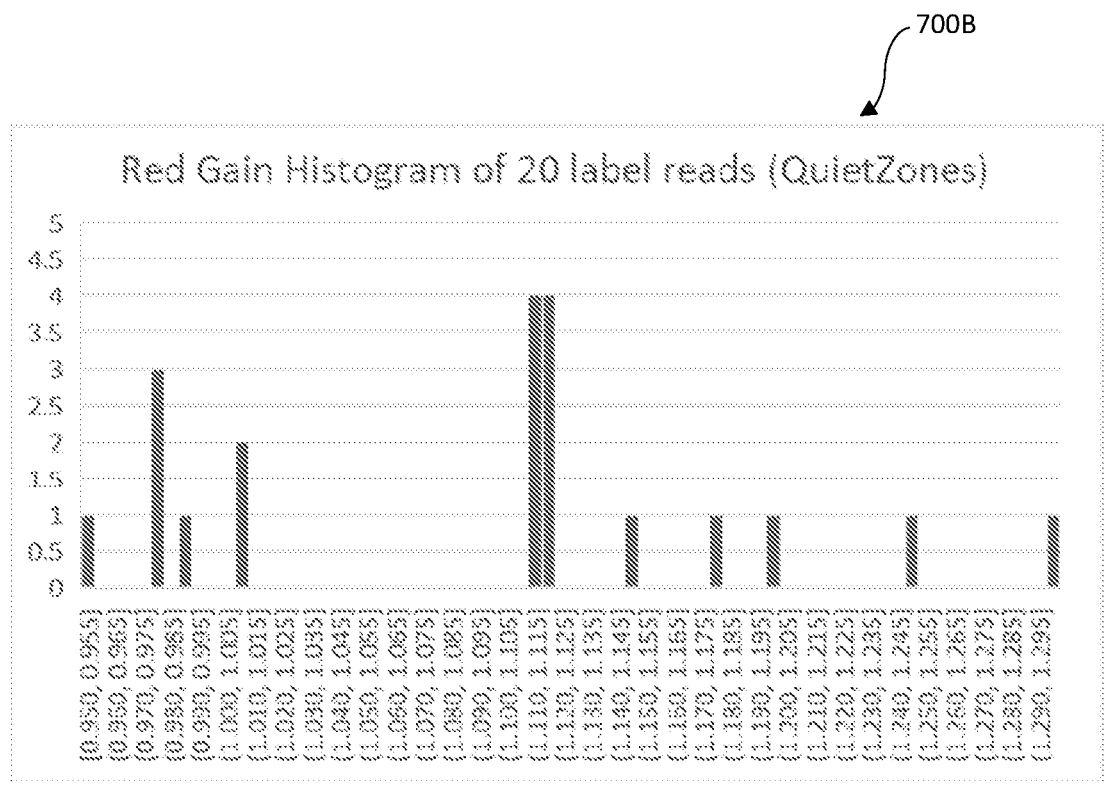
Figure 7C:
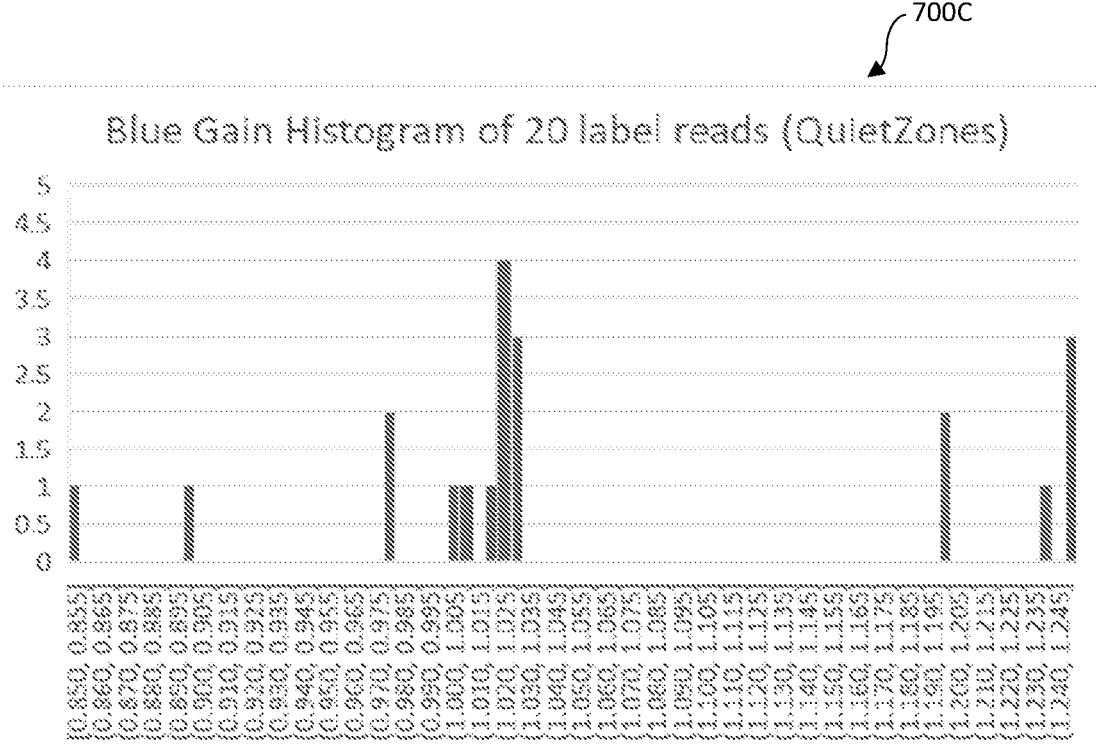
Figure 7D:
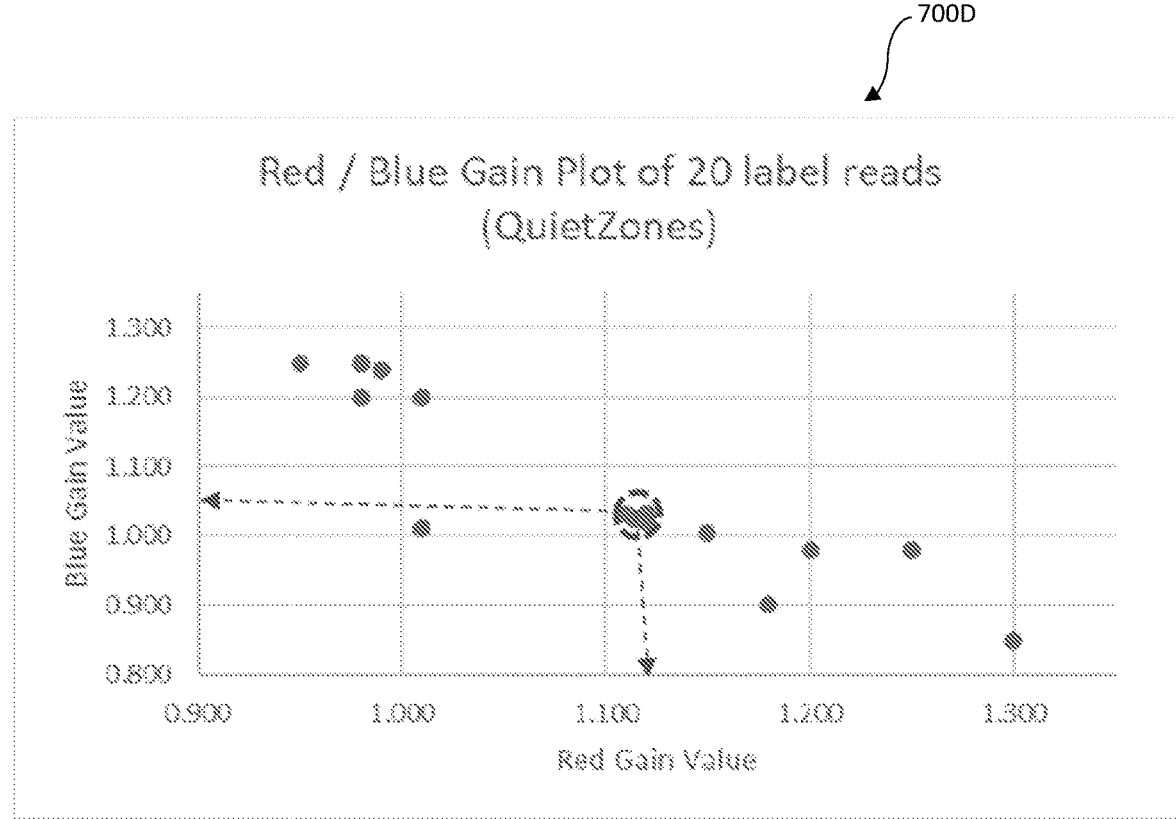

FIGS. 7A-7D show an example of such accumulation of label reads that may be used for determining color calibration parameters for calibration during real-time use. FIG. 7A shows a table showing the color gains (e.g., Red Gain and Blue Gain) for the target ROI (e.g., quiet zone) measured during a set of label reads over a predetermined number (n) of label reads. In this case, 20 label reads may be selected as the number of label reads after which calibration may be revisited. Other numbers of reads are also contemplated (e.g., 50, 100, etc.) as desired. These entries may be saved in a buffer as they are accumulated during operation. FIG. 7B is a histogram showing the red gain values associated with these label reads, and FIG. 7C is a histogram showing the blue gain values associated with these label reads. FIG. 7D is a red/blue gain plot associated with these label reads. After accumulating n (e.g., 20) label reads, the scanner analyzes the corresponding set of color gain values to determine which color gain values and/or color correction matrix to apply during the color calibration. In some embodiments, the color gain values may be the mode (e.g., within a tolerance range of values) determined for the accumulated set of values.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A code reader, comprising:
   a color imager; and
   a processor operably coupled to the color imager and configured to:
      set an RGB imager pixel color gain;
      capture at least one image with active or ambient illumination using the color imager with a calibration target in view;
      calculate a mean value of R, G, B pixels for the at least one image;
      use a color plane as a reference, determining a color gain to set calibration parameters;
      capture at least one additional image using the calibration parameters;
      save the calibration parameters if mean values of the R, G, B pixels for the at least one additional image are within a predetermined range to be used by the color imager for subsequent image capture; and
      apply to each pixel of the image a corresponding color correction matrix from among a plurality of stored color correction matrices.

2. The code reader of claim 1, wherein the code reader includes a top-down reader operably coupled to a base scanner.

3. The code reader of claim 2, wherein the processor is located within the top-down reader.

4. The code reader of claim 3, wherein the base scanner is a bioptic scanner having a horizontal window and a vertical window defining fields-of-view in two different planes.

5. The code reader of claim 4, wherein the base scanner includes at least one calibration target disposed thereon.

6. The code reader of claim 2, wherein the processor is located within the base scanner.

7. The code reader of claim 1, wherein the color imager is a multi-mode color camera, and the plurality of stored color correction matrices include a first set of color correction matrices associated with the multi-mode color camera operating in a first mode, and the plurality of stored color correction matrices include a second set of color correction matrices associated with the multi-mode color camera operating in a second mode.

8. The code reader of claim 7, wherein the first mode is a barcode reading mode, and the second mode is an object recognition mode.

9. The code reader of claim 1, wherein the code reader is incorporated within one of a handheld scanner, a presentation scanner, a scan engine, a fixed scanner, a top-down reader associated with a fixed scanner, a mobile computer, a point of sale system, a vision system, a robotic system, an automated driving system, or a machine vision system.

10. The code reader of claim 1, wherein the processor is configured to accumulate and save a set of color gains for a predetermined number of label reads, and to analyze the accumulated set of color gains to determine the calibration parameters and color correction matrix to apply during calibration.

11. The code reader of claim 10, wherein the calibration target is a quiet zone around a barcode label for an item being scanned.

12. The code reader of claim 1, wherein the processor is configured to identify an item being scanned and determine whether the item being scanned is included within a pre-stored database of items with known color gain values for a region of interest.

13. The code reader of claim 12, wherein the processor is configured to:
   use the measured color gain values and pre-stored color gain values associated with the item being scanned for selecting the color correction matrix if the item is included in the pre-stored database; and
   not use the measured color gain values associated with the item being scanned for selecting the color correction matrix if the item is not included in the pre-stored database.

14. A method for performing color calibration of a color imager in a code reader, the method comprising:
   setting an RGB imager pixel color gain;
   capturing at least one image with active or ambient illumination using a color camera with a calibration target in view;
   calculating a mean value of R, G, B pixels for the at least one image;
   using a color plane as a reference, determining a color gain to set calibration parameters;
   capturing at least one additional image using the calibration parameters;
   saving the calibration parameters if mean values of the R, G, B pixels for the at least one additional image are within a predetermined range to be used by the camera for subsequent image capture; and
   applying to each pixel of the image a corresponding color correction matrix from among a plurality of stored color correction matrices.

15. The method of claim 14, wherein the color plane used as a reference is a green color plane and setting red and blue color gains as the calibration parameters.

16. The method of claim 14, wherein the color plane used as a reference is a blue color plane and setting red and green color gains as the calibration parameters.

17. The method of claim 14, wherein the color plane used as a reference is a red color plane and setting green and blue color gains as the calibration parameters.

18. The method of claim 14, further comprising:
   accumulating a set of color gains within a region of interest for a predetermined number of items being scanned; and
   analyzing the accumulated set of color gains to determine the calibration parameters and color correction matrix to apply during calibration of the color camera.

19. The method of claim 18, wherein analyzing the accumulated set of color gains includes finding a mode for the accumulated set of color gains.

20. The method of claim 18, wherein the calibration target is a quiet zone around a barcode label for an item being scanned.

* * * * *